US009085684B2

(12) United States Patent
Chou

(10) Patent No.: US 9,085,684 B2
(45) **Date of Patent: *Jul. 21, 2015**

(54) HIGH STIFFNESS HIGH IMPACT PROPYLENE IMPACT COPOLYMERS

(75) Inventor: Chai-Jing Chou, Sugar Land, TX (US)

(73) Assignee: W.R. Grace & Co.-Conn., Columbia, MD (US)

(*) Notice: Subject to any disclaimer, the term of this patent is extended or adjusted under 35 U.S.C. 154(b) by 68 days.

This patent is subject to a terminal disclaimer.

(21) Appl. No.: 13/695,107

(22) PCT Filed: Jun. 6, 2011

(86) PCT No.: PCT/US2011/039247

§ 371 (c)(1), (2), (4) Date: Oct. 29, 2012

(87) PCT Pub. No.: WO2011/156262

PCT Pub. Date: Dec. 15, 2011

(65) Prior Publication Data

US 2013/0131274 A1 May 23, 2013

Related U.S. Application Data

(63) Continuation of application No. 12/797,717, filed on Jun. 10, 2010, now Pat. No. 8,178,623.

(51) Int. Cl.

*C08L 23/06* (2006.01)
*C08L 23/10* (2006.01)
*C08F 8/00* (2006.01)
*C08L 23/16* (2006.01)
*C08L 23/08* (2006.01)

(52) U.S. Cl.

CPC ................. *C08L 23/16* (2013.01); *C08L 23/10* (2013.01); *C08L 23/0815* (2013.01); *C08L 2207/02* (2013.01)

(58) Field of Classification Search

CPC ..... C08L 23/10; C08L 23/16; C08L 23/0815; C08L 2207/02; C08L 2666/08
USPC .......................................... 525/191, 232, 240
See application file for complete search history.

(56) References Cited

U.S. PATENT DOCUMENTS 6,395,832 B1 5/2002 Pelliconi et al.
8,178,623 B2 * 5/2012 Chou ............................ 525/191
2007/0037914 A1 2/2007 Heck et al.
2007/0117932 A1 5/2007 De Palo et al.
2011/0060085 A1 3/2011 Gahleitner et al.

FOREIGN PATENT DOCUMENTS

EP 1244717 A1 10/2002
JP 60-081206 A 5/1985
JP 09-151282 A 6/1997
JP 11-349746 A 12/1999
JP 2002-241452 A 8/2002
JP 2002-332362 A 11/2002
JP 2003-246900 A 9/2003
WO WO-2004060994 A1 7/2004

OTHER PUBLICATIONS

Scholte, TH. G., et al., Mark-Houwink Equation and GPC Calibration for Linear Short-Chain Branched Polyolefins, Including Polypropylene and Ethylene-Propylene Copolymers, Journal of Applied Polymer Science, 1984, pp. 3763-3782, vol. 29, John Wiley & Sons, Inc.

Martino, Di S., et al., Determination of the Composition of Ethylene-Propylene-Rubbers Using 13C-NMR Spectroscopy, Journal of Applied Polymer Science, 1995, pp. 1781-1787, vol. 56, John Wiley & Sons, Inc.

Otocka, E.P., et al., Distribution of Long and Short Branches in Low-Density Polyethylenes, Macromolecules, 1971, pp. 507-512, vol. 4, No. 4, Bell Telephone Laboratories, New Jersey.

* cited by examiner

*Primary Examiner* — Nathan M Nutter
(74) *Attorney, Agent, or Firm* — Lerner, David, Littenberg, Krumholz & Mentlik,LLP

(57) ABSTRACT

The present invention relates to polypropylene impact copolymer compositions which exhibit improved stiffness without degrading the impact resistance performance. The polypropylene impact copolymer comprises a matrix and a dispersed phase. The matrix comprises a polypropylene homopolymer or a propylene/alpha-olefin random copolymer which comprises more than 50 wt. % of units derived from propylene monomer. The matrix should have a relatively high crystallinity, preferably 50% or greater. The polypropylene homopolymer or a propylene/alpha-olefin random copolymer preferably has a MWD between 4 and 8, such as typically obtained using Ziegler-Natta catalysts. The dispersed phase in the impact copolymer comprises an ethylene-propylene copolymer which comprises from 45 to 70 wt. % of units derived from an ethylene monomer. Preferably the dispersed phase comprises from 20 to 50 percent by weight of the polypropylene impact copolymer.

11 Claims, No Drawings

HIGH STIFFNESS HIGH IMPACT PROPYLENE IMPACT COPOLYMERS

CROSS-REFERENCE TO RELATED APPLICATIONS

This application claims the benefit of U.S. Utility patent application Ser. No. 12/797,717, filed on Jun. 10, 2010, and fully incorporated herein by reference.

FIELD OF THE INVENTION

The present invention relates to polypropylene impact copolymers having improved stiffness and good impact properties.

BACKGROUND AND SUMMARY OF THE INVENTION

Propylene impact copolymers (ICP's) are commonly used in a variety of applications where strength and impact resistance are desired such as molded and extruded automobile parts, household appliances, luggage and furniture.

Propylene homopolymers or propylene based random copolymers having high crystallinity are often unsuitable for such applications by themselves because they are too brittle and have low impact resistance, whereas propylene impact copolymers are specifically engineered for applications such as these.

Propylene impact copolymers are typically an intimate mixture of a continuous phase of crystalline propylene homopolymer or random copolymer and dispersed rubbery phase of ethylene-propylene copolymer. In general the continuous phase is known to provide properties such as stiffness and the dispersed phase provides impact resistance properties.

In general, it has been observed that the properties of stiffness, and impact resistance trend in opposite directions such that as stiffness increases, impact resistance decreases and vice versa. It would be desirable to develop compositions which exhibit improved stiffness without degrading the impact resistance performance.

The present invention relates to such a composition. Specifically, one aspect of the present invention is a polypropylene impact copolymer comprising: a matrix and a dispersed phase. The matrix comprises a polypropylene homopolymer or a propylene/alpha-olefin random copolymer which comprises more than 50 wt. % of units derived from propylene monomer. The matrix should have a relatively high crystallinity, preferably 50% or greater. The polypropylene homopolymer or a propylene/alpha-olefin random copolymer preferably has a MWD between 4 and 8, such as typically obtained using Ziegler-Natta catalysts. The dispersed phase in the impact copolymer comprises an ethylene-propylene copolymer which comprises from 45 to 70 wt. % of units derived from an ethylene monomer. Preferably the dispersed phase comprises from 20 to 50 percent by weight of the polypropylene impact copolymer

DETAILED DESCRIPTION OF THE INVENTION

Analytical Methods:

Unless otherwise indicated, the following analytical methods are used in the present invention:

Flexural modulus is determined in accordance with ASTM D790-00 Method 1, using an ASTM D 638 specimen tested at 1.3 mm/min Molecular weights (Mn, Mw and Mz) and molecular weight distributions Mw/Mn (also referred to as "MWD") and Mz/Mw are measured by GPC according to the Gel Permeation Chromatography (GPC) Analytical Method for Polypropylene. The polymers are analyzed on a PL-220 series high temperature gel permeation chromatography (GPC) unit equipped with a refractometer detector and four PLgel Mixed A (20 μm) columns (Polymer Laboratory Inc.). The oven temperature is set at 150° C. and the temperatures of autosampler's hot and the warm zones are at 135° C. and 130° C. respectively. The solvent is nitrogen purged 1,2,4-trichlorobenzene (TCB) containing ~200 ppm 2,6-di-t-butyl-4-methylphenol (BHT). The flow rate is 1.0 mL/min and the injection volume was 200 μl. A 2 mg/mL sample concentration is prepared by dissolving the sample in N2 purged and preheated TCB (containing 200 ppm BHT) for 2.5 hrs at 160° C. with gentle agitation.

The GPC column set is calibrated by running twenty narrow molecular weight distribution polystyrene standards. The molecular weight (MW) of the standards ranges from 580 to 8,400,000 g/mol, and the standards were contained in 6 "cocktail" mixtures. Each standard mixture has at least a decade of separation between individual molecular weights. The polystyrene standards are prepared at 0.005 g in 20 mL of solvent for molecular weights equal to or greater than 1,000,000 g/mol and 0.001 g in 20 mL of solvent for molecular weights less than 1,000,000 g/mol. The polystyrene standards are dissolved at 150° C. for 30 min under stirring. The narrow standards mixtures are run first and in order of decreasing highest molecular weight component to minimize degradation effect. A logarithmic molecular weight calibration is generated using a forth-order polynomial fit as a function of elution volume. The equivalent polypropylene molecular weights are calculated by using following equation with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene(E. P. Otocka, R. J. Roe, N. Y. Hellman, P. M. Muglia, Macromolecules, 4, 507 (1971)):

$$M_{PP} = \left( \frac{K_{PS} M_{PS}^{a_{PS}+1}}{K_{PP}} \right)^{\frac{1}{a_{PP}+1}}$$

where $M_{pp}$ is PP equivalent MW, $M_{PS}$ is PS equivalent MW, log K and a values of Mark-Houwink coefficients for PP and PS are listed below in Table 1.

TABLE 1

| Polymer | A | log K |
|---|---|---|
| Polypropylene | 0.725 | -3.721 |
| Polystyrene | 0.702 | -3.900 |

Izod impact strength is measured in accordance with ASTM D 256.

Melt flow rate (MFR) is measured in accordance with ASTM D 1238-01 test method at 230° with a 2.16 kg weight for propylene-based polymers.

Xylene Solubles (XS) is measured according to the following procedure: 0.4 g of polymer is dissolved in 20 ml of xylenes with stiffing at 130° C. for 30 minutes. The solution is then cooled to 25° C. and after 30 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min The column is coupled to a Viscotek Model 302 Triple Detector Array, with light scattering, viscometer and refractometer detectors operating at 45° C. Instrument calibration was maintained with Viscotek PolyCAL™ polystyrene standards.

Melting point is determined by DSC, ASTM D3418.

Heat resistance (HDT) is determined according to ASTM D648.

Et (total ethylene wt. % in the propylene impact copolymer) is measured by a well known method reported by S. Di Martino and M. Kelchtermans "Determination of the Composition of Ethylene-Propylene Rubbers Using 13C-NMR Spectroscopy" J. of Applied Polymer Science, v 56, 1781-1787 (1995).

The amorphous rubber content in the impact copolymer generally can be assessed by dissolving the impact copolymer in xylene. The amount of xylene solubles measured by the Viscotek method (described above) plus 2 wt. % corresponds to the amount of dispersed rubber phase (Fc) in the impact copolymer.

Ec (ethylene content wt % in the dispersed phase) is calculated as Ec=Et*100/Fc.

The propylene impact copolymers (sometimes referred to as "ICPs") of this invention comprise at least two major components, the matrix and the dispersed phase. The matrix is preferably an isotactic propylene homopolymer, though small amounts of a comonomer may be used to obtain particular properties. Typically such copolymers of the matrix contain 10% by weight or less, preferably less than 6% by weight or less, comonomer such as ethylene, butene, 1-hexene or 1-octene. Most preferably less than 4% by weight ethylene is used. The inclusion of comonomer typically results in a product with lower stiffness but with higher impact strength compared to impact copolymers where the matrix is homopolymer polypropylene.

The characteristics of the matrix of the impact copolymers can generally be determined from an analysis of the xylene insoluble portion of the impact copolymer composition, while the characteristics of the dispersed phase are attributable to the xylene soluble portion.

The polymer material used in the matrix of the impact copolymers of the present invention preferably has a relatively broad molecular weight distribution Mw/Mn ("MWD"), i.e., 4.0 to about 8, preferably greater than 4 to about 7, more preferably from 4.5 to 6. These molecular weight distributions are obtained in the absence of visbreaking using peroxide or other post reactor treatment designed to reduce molecular weight. In general polymers having a higher MWD results in impact copolymers having greater stiffness but less impact resistance.

The matrix polymer preferably has a weight average molecular weight (Mw as determined by GPC) of at least 200,000, preferably at least 300,000 and a melting point (Mp) of at least 145° C., preferably at least 155° C., more preferably at least 152° C., and most preferably at least 160° C.

Another important parameter of the matrix polymer is the amount of xylene solubles (XS)they contain. The matrix polymer of this invention are characterized as having low XS, preferably less than 3% by weight, more preferably less than 2% by weight, even more preferably less than 1.5% by weight.

The dispersed phase for use in the impact copolymers of the present invention comprises propylene/ethylene copolymer where the propylene/ethylene copolymer is comprised of from 45 to 70 wt. % of units derived from an ethylene monomer. More preferably the propylene/ethylene copolymer is comprised of from 50 to 65 wt. % of units derived from an ethylene monomer. In some application it may be preferably that the propylene/ethylene copolymer comprises more than 50% of units derived from an ethylene monomer.

The propylene/ethylene copolymer for use as the dispersed phase in the present invention preferably has a molecular weight distribution Mw/Mn ("MWD"), of at least 2.5, preferably 3.5, and most preferably 4.5 or higher. These molecular weight distributions should be obtained in the absence of visbreaking or peroxide or other post reactor treatment designed to reduce molecular weight. The propylene/ethylene copolymer preferably has a weight average molecular weight (Mw as determined by GPC) of at least 100,000, preferably at least 150,000, and most preferably at least 200,000.

While these impact polypropylene products can be produced by melt compounding the individual polymer components, it is preferred that they are made in reactor. This is conveniently accomplished by polymerizing propylene in a first reactor and transferring the high crystalline polypropylene from the first reactor into a secondary reactor where propylene and ethylene are copolymerized in the presence of the high crystalline material. Such "reactor-grade" products, theoretically can be interpolymerized in one reactor, but are more preferably formed using two reactors in series. The final impact copolymers as obtained from the reactor or reactors, however, can be blended with various other components including other polymers.

The preferred melt flow rate ("MFR") of the impact copolymers of the present invention depends on the desired end use but is typically in the range of from about 0.2 dg/min to about 200 dg/min, more preferably from about 5 dg/min to about 100 dg/min Significantly, high MFRs, i.e., higher than 50 dg/min, are obtainable. MFR is determined by a conventional procedure such as ASTM-1238 Cond. L (230° C./ 2.16 kg) . Another known route to a high MFR product involves chemical treatment, i.e., visbreaking (peroxide treatment) of a molten PP heterophasic copolymer. The impact copolymers of the present invention generally comprise from about 50% to about 80% by weight of the matrix and from about 20% to about 50% by weight of the dispersed phase, preferably from about 60% to about 70% by weight of the matrix and from about 30% to about 40% of the dispersed phase.

The overall comonomer (preferably ethylene) content of the total impact copolymer is preferably in the range of from about 10% to about 35% by weight, more preferably from about 12% to about 28% by weight, even more preferably from about 15% to about 25% by weight comonomer.

A variety of additives may be incorporated into the impact copolymer for various purposes as is generally known in the art. Such additives include, for example, stabilizers, antioxidants, fillers, colorants, nucleating agents and mold release agents.

The impact copolymers of this invention may conveniently be prepared by conventional polymerization processes such as a two-step process although it is conceivable that they may be produced in a single reactor. Each step may be independently carried out in either the gas or liquid slurry phase. For example the first step may be conducted in a gas phase or in liquid slurry phase. Preferably the impact copolymers of this invention are produced in multiple reactors, preferably two or three, operated in series. The dispersed phase is preferably polymerized in a second, gas phase reactor.

In an alternative embodiment, the polymer material used for the matrix is made in at least two reactors in order to obtain fractions with varying melt flow rate. This has been found to improve the processability of the impact copolymers.

As is generally known in the art, hydrogen may be added to any of the reactors to control molecular weight, intrinsic viscosity and melt flow rate (MFR).

The composition of the dispersed rubber phase is controlled (typically in the second reactor) by the ethylene/propylene ratio and the amount of hydrogen.

By way of example and not by limitation, examples of the present disclosure will now be provided.

Examples

A first series of propylene impact copolymers was made in a dual reactor set up where the matrix polymer was made in a first gas phase reactor and then the contents of the first reactor are passed to a second gas phase reactor. The ethylene content in the rubber phase(Ec) and the amount of the dispersed phase (Fc) for each ICP is reported in Table 1 below. Typical reaction conditions are used to make these impact co-polymers. The melt flow rate of the granules after the second reactor for each of these materials is about 1.4 g/10 min. The powder granules are cracked so that the cracked material has a target melt flow rate of around 8 g/10 minutes, using Trigonox301 as a peroxide-containing visbreaking agent in a 30 mm co-rotating twin screw extruder. A typical anti-oxidant package and nucleator agent Sodium Benzoate 800 ppm are added into all the examples during vis-breaking.

The pellet samples are injection molded according to ASTM D4101 with a 4-cavity family mold. The resulting molded dog-bone is used for flex and Izod testing. The resulting molded straight bar is used for heat resistance (HDT) testing according to ASTM D648. The results of these tests are presented in Table 1.

As seen from the Table, Examples 1, 2 and 3 have better Flexual modulus, Izod impact, and heat resistance (HDT) than comparative example 1 in most situations.

TABLE 1

| Examples | 1 | 2 | Comp. 1 | 3 |
|---|---|---|---|---|
| MF (g/10 min), Rx 2 | 1.5 | 1.4 | 1.3 | 1.4 |
| MF (g/10 min), final | 10.3 | 6.5 | 9.9 | 7.7 |
| Ec, wt. % | 52 | 56 | 40 | 46 |
| Fc, Wt % | 36 | 37 | 35 | 35 |
| Flex, Kpsi, 1% Secant modulus | 130 | 125 | 113 | 119 |
| N. Izod, ft-lb/in @ 23° C. | 14.7 | 14.8 | 13.5 | 13.6 |
| N. Izod, ft-lb/in @ 0° C. | 13.7 | 14.1 | 13.5 | 13.7 |
| N. Izod, ft-lb/in @-20° C. | 12.7 | 13.9 | 12.8 | 13.0 |
| HDT, ° C. | 85 | 85 | 78 | 80 |

A second series of propylene impact copolymers are made as described above except that the powder granules are cracked to around 12 MF as seen from Table 2. Preparation of materials for testing and the tests themselves are conducted as set forth above for Table 1. The results of these tests are presented in Table 2.

As seen from the Table, Examples 4, 5 and 6 have better Flexual modulus, Izod impact, and heat resistance (HDT) than comparative example 2 in most situations.

TABLE 2

| Examples | 4 | 5 | Comp 2 | 6 |
|---|---|---|---|---|
| MF (g/10 min), Rx 2 | 1.5 | 1.4 | 1.3 | 1.4 |
| MF (g/10 min), final | 12.1 | 11.2 | 13.1 | 12 |
| Ec, wt. % | 52 | 56 | 40 | 46 |
| Fc, Wt % | 36 | 37 | 35 | 35 |
| Flex, Kpsi, 1% Secant modulus | 127 | 121 | 112 | 117 |
| N. Izod, ft-lb/in @ 23° C. | 13.5 | 13.6 | 13.2 | 13.4 |
| N. Izod, ft-lb/in @ 0° C. | 12.8 | 13.8 | 13.2 | 13.3 |
| N. Izod, ft-lb/in @-20 ° C. | 11.4 | 12.9 | 12 | 12.2 |
| HDT, ° C. | 80 | 81 | 77 | 80 |

What is claimed is:

1. A polypropylene impact copolymer comprising:

(a) a matrix comprising a polypropylene homopolymer or a propylene/alpha-olefin random copolymer which comprises more than 50 wt. % of units derived from propylene monomer, the polypropylene homopolymer or a propylene/alpha-olefin random copolymer having an MWD between 4 and 8; wherein said matrix has a crystallinity of at least 50%;

(b) a dispersed phase comprising an ethylene-propylene copolymer which comprises from 45 to 70 wt. % of units derived from an ethylene monomer;

wherein the dispersed phase comprises from 20 to 50 percent by weight of the polypropylene impact copolymer;

wherein the alpha-olefin of the propylene/alpha-olefin random copolymer is selected from the group consisting of ethylene, butene, 1-hexene and 1-octene; and wherein the overall alpha-olefin content of the impact copolymer is in the range of from about 10% to about 35% by weight.

2. The propylene impact copolymer of claim 1 wherein the dispersed phase comprises from 30 to 40 percent by weight of the polypropylene impact copolymer.

3. The propylene impact copolymer of claim 1 wherein the matrix comprises a polypropylene homopolymer.

4. The propylene impact copolymer of claim 1 wherein the matrix has an MWD between 4 and 6.

5. The propylene impact copolymer of claim 1 wherein the matrix is a propylene/alpha-olefin random copolymer which comprises more than 90 wt. % of units derived from propylene monomer.

6. The propylene impact copolymer of claim 1 wherein the matrix is a propylene/alpha-olefin random copolymer in which the alpha-olefin is ethylene.

7. The propylene impact copolymer of claim 1 wherein the matrix has a crystallinity greater than 60%.

8. The propylene impact copolymer of claim 1 wherein the dispersed polymer comprises at least 50 wt. % of ethylene.

9. The propylene impact copolymer of claim 1 having a melt flow rate of from 1 to 50 g/10 min (230° C./2.16 kg).

10. The propylene impact copolymer of claim 1 which has been vis-broken and the vis-breaking ratio is greater than or equal to 2.

11. The propylene impact copolymer of claim 10 in which the vis-breaking ratio is greater than or equal to 4.

* * * * *